H. STRAIN, DEC'D.
A. STRAIN, ADMINISTRATRIX.
TRACTION WHEEL.
APPLICATION FILED APR. 1, 1918.

1,305,977.

Patented June 3, 1919.
2 SHEETS—SHEET 1.

Henry Strain,
Inventor

By Jerry A Mathews
Lester L Sargent
Attorneys.

H. STRAIN, DEC'D.
A. STRAIN, ADMINISTRATRIX.
TRACTION WHEEL.
APPLICATION FILED APR. 1, 1918.
1,305,977.
Patented June 3, 1919.
2 SHEETS—SHEET 2.
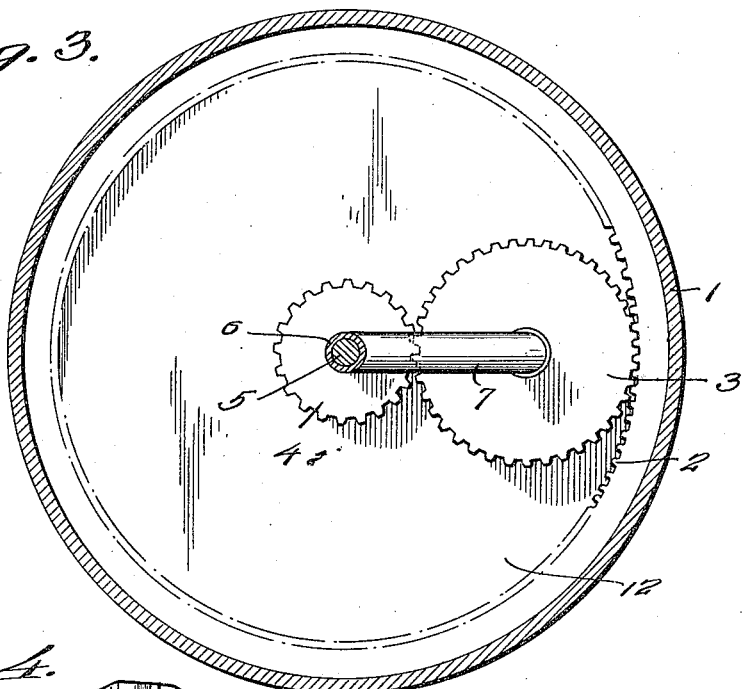
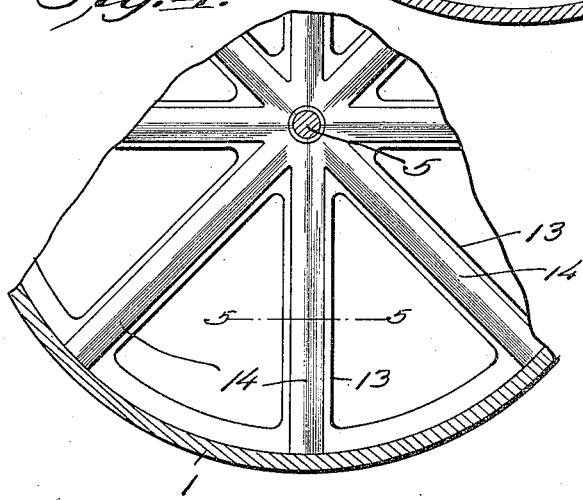

UNITED STATES PATENT OFFICE.

HENRY STRAIN, OF TRELOAR, MISSOURI; ALMA STRAIN ADMINISTRATRIX OF SAID HENRY STRAIN, DECEASED.

TRACTION-WHEEL.

1,305,977.  Specification of Letters Patent.  Patented June 3, 1919.

Application filed April 1, 1918. Serial No. 225,994.

*To all whom it may concern:*

Be it known that I, HENRY STRAIN, a citizen of the United States, residing at Treloar, in the county of Warren and State of Missouri, have invented a new and useful Traction-Wheel, of which the following is a specification.

The object of my invention is to provide an improved traction wheel for use on tractors and trucks; to provide in connection with the traction wheel an improved gear drive to make possible increased power with less strain on the wheel; and to provide an oil chamber for the gear drive.

I attain the objects of my invention by the mechanism illustrated in the accompanying drawings, in which—

Figure 1:
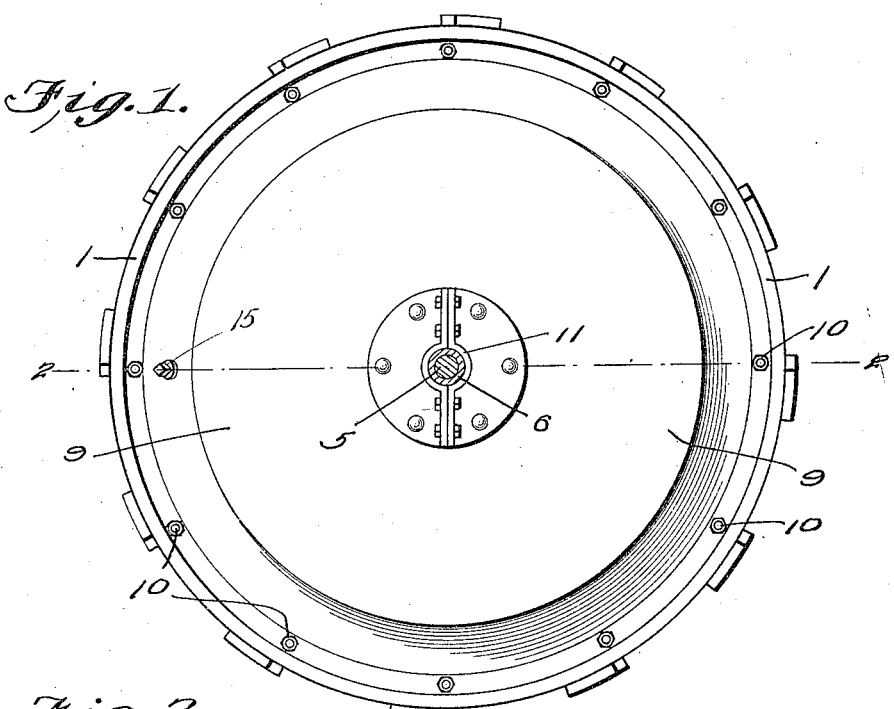
Figure 2:
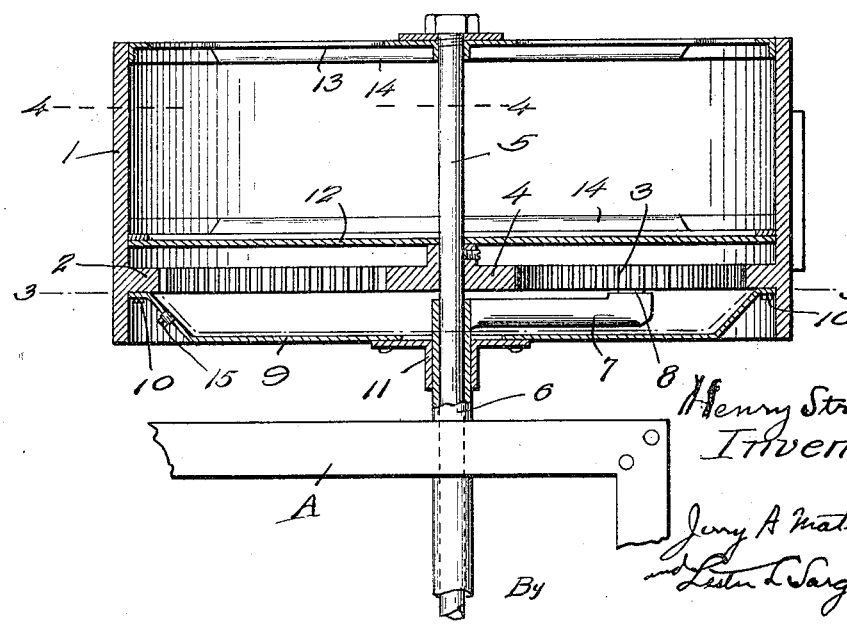

Figure 1 is a side elevation; Fig. 2 is a section on line 2—2 of Fig. 1; Fig. 3 is a section on line 3—3 of Fig. 2; Fig. 4 is a detail sectional view on line 4—4 of Fig. 2; and Fig. 5 is a detail sectional view on line 5—5 of Fig. 4.

Like numerals designate like parts through the views.

Referring to the accompanying drawings, I provide a suitable truck wheel rim 1 having a gear member 2, meshing with the intermediate gear 3 which in turn meshes with the central gear 4. Gear 4 is affixed to axle 5. I provide an axle sleeve 6 loosely mounted on axle 5, member 6 being attached to a suitable portion of the vehicle frame A. Member 6 is provided with an arm 7 having a stud 8 which serves as the axle member for the intermediate gear 3. The gear drive formed by the gearing described is contained within an oil chamber formed by the walls 9 and 12 respectively. Wall 9 is suitably secured to member 11 and to member 2 by bolts 10. Wall 12 is provided with ribs 14 which reinforce this wall, as illustrated in detail in Figs. 2 and 5. I provide similar ribs 14 in connection with the wheel spokes 13.

In operation, power transmitted through axle 5 is communicated from gear 4, which is rigidly attached to the axle 5, to the intermediate gear 3 and from the latter member to the annular gear member 2, which member forms an integral part of rim 1 or is rigidly affixed thereto. I provide in wall 9 on the bent-in portion thereof a suitable oiling device 15 whereby oil may be supplied to the chamber within so that the gears will constantly run in oil. The vehicle frame is rigidly affixed to the axle sleeve 6, within which axle 5 is loosely mounted to permit of its rotation. The axle 5 is also rotatably mounted in the hub portion 17 of spokes 13. It will be observed that I position the gear drive in a position offset from the center of the wheel and adjacent to the vehicle. Various advantages result from this arrangement. The gears run in oil and less strain is imposed on all gears and other working parts of the machine in consequence of the positioning of the train of gears as shown in Fig. 2. The device is especially designed for use on tractors or heavy trucks.

What I claim is:

1. In a device of the class described, the combination of a truck wheel, an axle on which the wheel is rotatably mounted, the wheel having a wall adjacent the vehicle, the remaining portion of the wheel being removable from said wall without removing gears or axle sleeve, an annular gear member secured to the inside of the truck wheel in proximity to the side of the truck wheel adjacent the vehicle, a vehicle frame, an an axle sleeve rigidly attached to said frame and loosely mounted over the axle, an arm carried by the axle sleeve, a gear mounted on said arm, the gear engaging the annular gear member, and a third gear rigidly attached to the axle and engaged by said second gear, substantially as described.

2. In combination with the mechanism described in claim 1, a second wall member, the aforesaid wall members being secured to the inside of the truck wheel and arranged in proximity to and on either side of the train of gears to form an oil chamber.

HENRY STRAIN.

Copies of this patent may be obtained for five cents each, by addressing the "Commissioner of Patents, Washington, D. C."